Patented Dec. 4, 1923.

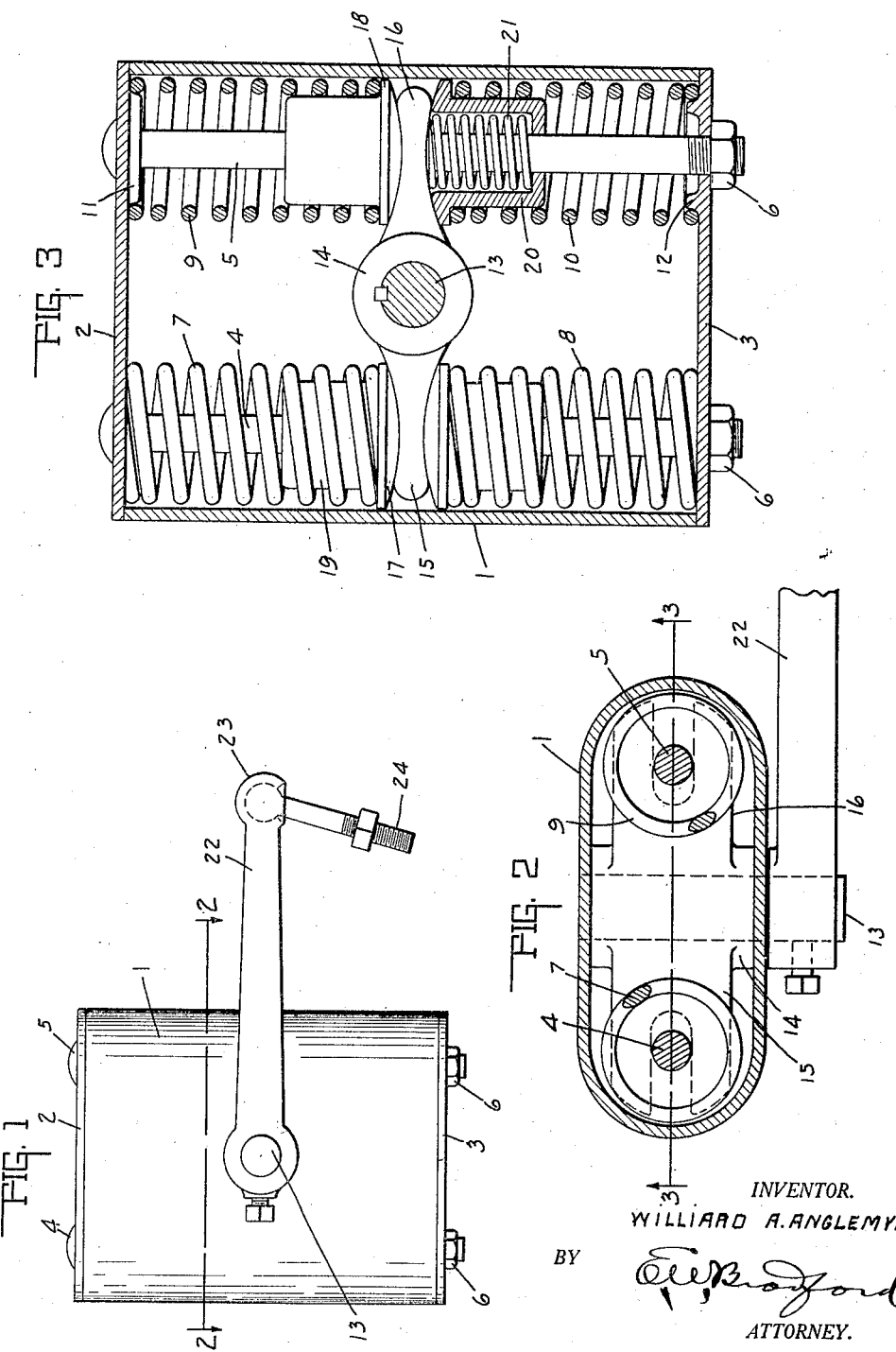

1,476,320

UNITED STATES PATENT OFFICE.

WILLIARD A. ANGLEMYER, OF INDIANAPOLIS, INDIANA.

SHOCK ABSORBER.

Application filed April 17, 1922. Serial No. 553,384.

*To all whom it may concern:*

Be it known that I, WILLIARD A. ANGLE-MYER, a citizen of the United States, residing at Indianapolis, in the county of Marion and State of Indiana, have invented certain new and useful Improvements in Shock Absorbers, of which the following is a specification.

This invention relates to a combined shock absorber and rebound check, and the prime feature of the invention is the provision of pairs of springs and an actuating member so positioned with respect to said springs that certain of the springs will be depressed in whichever direction the actuating member may be turned.

A further feature of the invention is the provision of means for holding the inoperative parts of the device against undue movement while the operating parts are in action, thereby eliminating noises and undue wear.

A further feature of the invention is the provision of means for operating the actuating member incident to the movement of parts of the vehicle.

And a further feature of the invention is the provision of a suitable housing for enclosing the shock absorber and rebound check.

Other objects and advantages will be hereinafter more fully set forth and pointed out in the accompanying specification.

In the accompanying drawings,

Figure 1 is a side elevation of the device ready for use,

Figure 2 is a sectional view thereof as seen on line 2—2, Figure 1, and

Figure 3 is a sectional view as seen on line 3—3, Figure 2.

Referring to the drawings, 1 indicates a housing preferably in the form of a metallic shell, the upper and lower ends of which are closed by means of plates 2 and 3 said plates being held in engagement with the ends of the housing by means of bolts 4 and 5, said bolts extending longitudinally through the housing and are held in place by means of nuts 6. Surrounding the bolt 4 is a pair of coil springs 7 and 8, while a similar set of springs 9 and 10, surround the bolt 5, the inner faces of the plates 2 and 3 having shoulders 11 and 12 respectively, for engagement with the outer ends of the respective springs thereby holding the ends of the springs in proper alignment with the bolts.

Extending transversely through the housing 1 and preferably at the longitudinal center thereof, is a shaft 13 and on that part of the shaft within the housing is fixed a hub 14 of an actuating member, said hub having at diametrically opposite sides, arms 15 and 16, which pass respectively between the inner ends of each associated pair of springs 7 and 8 and 9 and 10, the arms 15 and 16 being bifurcated at their outer ends so as to straddle the bolts 4 and 5. In order to reduce wear between the arms 15 and 16, and the respective springs co-operating therewith, pairs of wear plates 17 and 18 are positioned around the bolts 4 and 5 respectively, and on opposite sides of said arms, said wear plates being preferably rounded so as to reduce wear to a minimum, these wear plates preferably having elongated pockets 19 and 20 which project into the ends of the coil springs thereby securely holding the plates in position and also retaining the ends of the springs in alignment with the bolts.

In this form of device, when the actuating member is rocked, one spring of one set is depressed while the other spring of the set remains substantially idle, and to prevent any back-slap or pounding of the parts, relatively light springs 21 are disposed around the bolts 4 and 5 and entered into the pockets of the wear plates, the pressure of these springs being sufficient to check the quick return movement of the actuating member and also hold the wear plates in position within the ends of the respective coil springs.

One end of the shaft 13 projects through one wall of the housing 1 and has connected therewith an actuating lever 22 on the outer end of which is formed a ball and socket connection 23 for engagement with an actuating pitman 24, said pitman preferably connecting with parts of the running gear of a vehicle, while the housing 1 is preferably connected with parts of the body of the vehicle.

By attaching the housing 1 to the body of the vehicle and the pitman 24 to parts of the running gear of the vehicle, any movement of either the body or parts of the running gear will operate the lever 22 and set up rocking action of the hub 14, and as the arms 15 and 16 are rigid therewith, one spring of one pair and the opposite spring of the other pair will be depressed, thereby absorbing any shock and eliminating any rebound imparted to parts of the vehicle. In the event a blow is delivered to the running gear of the vehicle, the pitman 24 will be thrust upwardly thereby swinging the outer end of the lever 22 upwardly and causing arm 15 to descend and compress the spring 8, while the arm 16 will ascend and compress the spring 9, and in the event that downward movement is imparted to the body of the vehicle, the same action will result, but in the event of an attempted rebound of the body of the vehicle the arms 15 and 16 will be rocked in the opposite direction thereby depressing the springs 7 and 10 and effectually absorbing the rebound of the body.

When the parts of the springs are mounted within the housing they are placed therein under a certain amount of compression and under ordinary circumstances will always maintain the wearing plates in engagement with the ends of their respective springs, but in the event of an excess movement of the arms, which would carry the arms beyond the point of the normal expansion of the springs, the wear plates are securely held in place by means of the auxiliary springs 21, the tension of the auxiliary springs being sufficient to hold the wear plates against movement independent of the springs with which they are associated.

Any suitable means may be provided for attaching the housing and pitman to the parts of the vehicle, but as they form no part of the present invention it is not deemed necessary to show and describe the same, and it will be fully understood that the housing 1 may be attached to the body portion of the vehicle while in a vertical position, or may be turned to a horizontal position, the operation in either instance being identical.

Having thus fully described my said invention, what I claim as new and desire to secure by Letters Patent, is:

1. In a combined shock absorber and rebound check for vehicles, springs arranged in pairs, an actuating member comprising a hub and a pair of laterally extending integral arms, each arm passing between the inner ends of the respective pairs of springs, means for rocking the actuating member in either direction for compressing one or the other of the pairs of springs, wear plates introduced between the inner ends of the springs and said arms, a pocket on each wear plate fitting within the end of its respective spring for holding the spring centered around its bolt, and an auxiliary spring in each pocket adapted to press against said arms for holding the plates in engagement with the ends of the springs at all times and check the quick return movement of the actuating member.

2. In a combined shock absorber and rebound check for vehicles, a housing having closures for both ends thereof, bolts extending longitudinally through said housing and closures, springs arranged in pairs and positioned around said bolts, said closures having retaining means for the outer ends of said springs, a shaft extending transversely through the housing between the pairs of springs, a hub on said shaft, an integral arm at each side of said hub and extending between the inner ends of the pairs of springs, and entirely within the housing, whereby one or the other spring of each pair will be depressed when the arms are rocked in opposite directions, wear plates surrounding said bolts, pockets on said wear plates forming retaining members for centering the inner ends of said springs with said bolts, and means for employing the movement of parts of the vehicle for actuating said shaft and arms.

3. In a combined shock absorber and rebound check for vehicles, a housing, bolts extending through said housing, a pair of springs surrounding each bolt, a pair of arms pivotally mounted within said housing, each arm passing between the inner ends of one pair of said springs, means for rocking said arms for compressing said springs, wear plates interposed between said arms and said springs, pockets formed in said wear plates and auxiliary springs also surrounding said bolts and positioned in said pockets for retaining the wear plates in position.

In witness whereof, I have hereunto set my hand and seal at Indianapolis, Indiana, this 14th day of April, A. D. nineteen hundred and twenty-two.

WILLIARD A. ANGLEMYER. [L. S.]

Witnesses:
CAREY S. FRYE,
M. L. SHULER.